US009302851B2

(12) United States Patent
Esser et al.

(10) Patent No.: US 9,302,851 B2
(45) Date of Patent: Apr. 5, 2016

(54) FASTENING DEVICE FOR RELEASABLY FASTENING A MECHANISM IN THE REGION OF A FLOOR OF AN AIRCRAFT OR SPACE CRAFT AND ARRANGEMENT FOR A CARGO LOADING SYSTEM

(71) Applicant: AIRBUS OPERATIONS GMBH, Hamburg (DE)

(72) Inventors: Markus Esser, Bremen (DE); Ali Lohmann, Sottrum (DE); Jörg Pump, Hamburg (DE); Sönke Hager, Bremen (DE); Johannes Völker, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/163,343

(22) Filed: Jan. 24, 2014

(65) Prior Publication Data

US 2014/0202824 A1 Jul. 24, 2014

Related U.S. Application Data

(60) Provisional application No. 61/755,991, filed on Jan. 24, 2013.

(30) Foreign Application Priority Data

Jan. 24, 2013 (DE) .......................... 10 2013 201 120

(51) Int. Cl.
*B65G 13/11* (2006.01)
*B65G 39/12* (2006.01)
(Continued)

(52) U.S. Cl.
CPC ................ *B65G 13/11* (2013.01); *B60R 11/00* (2013.01); *B64C 1/20* (2013.01); *B64D 9/00* (2013.01);
(Continued)

(58) Field of Classification Search
CPC .. B64D 2009/006; B65G 13/11; B65G 39/12; B65G 21/02; B65G 21/06
USPC ................. 193/35 R, 35 J; 198/735.2, 860.2; 244/118.1, 118.2
See application file for complete search history.

(56) References Cited

U.S. PATENT DOCUMENTS 3,182,608 A 5/1965 Mollon
3,561,516 A 2/1971 Reddy
(Continued)

FOREIGN PATENT DOCUMENTS

DE 11 24 307 A 2/1962
DE 60 2004 004 731 T2 11/2007
(Continued)

OTHER PUBLICATIONS

German Office Action for Application No. 10 2013 201 120.2 dated Sep. 5, 2013.
(Continued)

*Primary Examiner* — Leslie A Nicholson, III
(74) *Attorney, Agent, or Firm* — Jenkins, Wilson, Taylor & Hunt, P.A.

(57) ABSTRACT

A fastening device is disclosed for releasably fastening a mechanism in the region of a floor of an aircraft or spacecraft and includes a base component and a latch component. The latch component includes at least one holding portion including a latch-component-side holding face and is movably coupled to the base component between an unlocked and a locked position. When positioned in a predefined mounting position on the floor component and/or on the base component, the holding portion of the latch component engages a fastening portion, and the latch-component-side holding face faces the mechanism-side holding face. During passage of the latch component from locked position into unlocked position a gap between the latch-component-side holding face and the mechanism-side holding face continuously widens. The invention further relates to an arrangement for a cargo loading system.

15 Claims, 7 Drawing Sheets

(51) Int. Cl.
*B65G 21/02* (2006.01)
*B65G 21/06* (2006.01)
*B60R 11/00* (2006.01)
*B64C 1/20* (2006.01)
*B65G 13/00* (2006.01)
*F16B 21/02* (2006.01)
*B64D 9/00* (2006.01)

(52) U.S. Cl.
CPC ............... *B64D 9/003* (2013.01); *B65G 13/00* (2013.01); *B65G 21/02* (2013.01); *B65G 21/06* (2013.01); *B65G 39/12* (2013.01); *F16B 21/02* (2013.01); *B64D 2009/006* (2013.01)

(56) References Cited

U.S. PATENT DOCUMENTS

| | | |
|---|---|---|
| 3,727,581 A | 4/1973 | Brent |
| 3,956,803 A | 5/1976 | Leitner |
| 4,349,168 A | 9/1982 | Barnes et al. |
| 4,575,295 A | 3/1986 | Rebentisch |
| 7,040,849 B2 | 5/2006 | Cunningham et al. |
| 7,175,377 B2 | 2/2007 | Womack et al. |
| 7,344,013 B2 * | 3/2008 | Krueger ............... 193/35 R |
| 7,401,995 B2 | 7/2008 | Senakiewich, II |
| 2006/0243861 A1 | 11/2006 | Krueger |
| 2012/0000291 A1 | 1/2012 | Christoph et al. |

FOREIGN PATENT DOCUMENTS

| | | |
|---|---|---|
| EP | 0 689 003 A1 | 12/1995 |
| GB | 2 431 148 A | 4/2007 |
| WO | WO 02/076790 A1 | 10/2002 |

OTHER PUBLICATIONS

European Search Report for Application No. 14151963 dated May 21, 2014.

* cited by examiner

FASTENING DEVICE FOR RELEASABLY FASTENING A MECHANISM IN THE REGION OF A FLOOR OF AN AIRCRAFT OR SPACE CRAFT AND ARRANGEMENT FOR A CARGO LOADING SYSTEM

CROSS REFERENCE TO RELATED APPLICATIONS

This application claims the benefit of and priority to U.S. Provisional Application No. 61/755,991 filed Jan. 24, 2013 and German patent application No. 10 2013 201 120.2 filed Jan. 24, 2013, the entire disclosures of which are herein incorporated by reference.

TECHNICAL FIELD

The present invention relates to a fastening device for releasably fastening a mechanism in the region of a floor of an aircraft or spacecraft. In particular, the fastening device may be used for releasably fastening a mechanism in the region of a cargo hold floor of an aircraft or spacecraft. The invention further relates to an arrangement for a cargo loading system of an aircraft or spacecraft.

BACKGROUND

Although the invention may be useful for releasably fastening various mechanisms, assemblies or pieces of equipment in the region of a floor within an aircraft or spacecraft, the set of problems on which the invention is based are to be explained in greater detail in the following in relation to fastening a mechanism which forms a component of a cargo loading system in the cargo hold of an aeroplane.

So as to move and position pieces of cargo, cargo pallets or cargo containers as expediently and time-efficiently as possible in a cargo hold of an aeroplane when loading said aircraft, specially formed mechanisms are often provided for this purpose in the region of the cargo hold floor. Mechanisms of this type comprise in particular roller tracks, which together form a roller system which in turn forms part of the cargo loading system of the aeroplane. In particular, roller tracks of this type are provided with rollers which are set up so as for example to carry and movably support pallets or containers and which thus make it possible to move the pallets and containers within the cargo hold during the loading and unloading process.

Whilst roller tracks of this type are intended to be available for efficiently transporting for example luggage, packaged goods or other cargo in containers or on pallets in the region of the cargo hold floor, it may also be desirable, in particular in the case of aeroplanes which are basically used for transporting cargo, depending on the type of cargo to be transported, to have as smooth and planar a cargo hold floor as possible available, from which no additional mechanisms such as roller tracks or the like protrude. A planar, obstacle-free cargo hold floor may for example be desirable if vehicles, for example heavy-goods vehicles, are to be moved into the cargo hold of a cargo aeroplane under their own power.

It would thus be useful to fasten roller tracks, and if desired also other mechanisms which are installed on the cargo hold floor and form components of a cargo loading system or a roller system, releasably in the region of the cargo hold floor, so as to be able to reconfigure the cargo hold time-efficiently for adaptation to the cargo to be transported.

SUMMARY

Against this background, an aspect of the present invention is to specify a device which makes it reliably possible to fasten a device, such as a roller track for a cargo loading system, releasably in the region of the floor of an aircraft or spacecraft. A device suitable for this purpose is to be provided which is also good to operate and makes possible rapid adaptation of the cargo hold to the loads to be transported. Preferably, the device to be provided should still be functional and simple to operate under adverse circumstances such as in the event of severe soiling of the floor. A further aspect of the present invention is to improve a cargo loading system of an aircraft or spacecraft accordingly.

Accordingly, the invention provides a fastening device which is used for releasably fastening a mechanism in the region of a floor, in particular a cargo hold floor, of an aircraft or spacecraft and comprises a base component and a latch component. The base component is provided so as to be rigidly coupled to a floor component which is formed for introducing a load into the floor, for example a duct or a rail. The latch component comprises at least one holding portion comprising a latch-component-side holding face. Further, the latch component is coupled to the base component in such a way that the latch component is movable between an unlocked position and a locked position with respect to the base component.

According to the invention, the latch component of the fastening device is formed in such a way that, when the mechanism is positioned in part in a predefined mounting position on the floor component and/or on the base component, the holding portion of the latch component engages around a fastening portion, which is formed on the mechanism and equipped with at least one mechanism-side holding face, in the region of the mechanism-side holding face during the passage of the latch component into the locked position. This engagement takes place in such a way that the latch-component-side holding face faces the mechanism-side holding face. In the fastening device, the latch-component-side holding face is formed in such a way that during passage of the latch component from the locked position into the unlocked position a gap between the latch-component-side holding face and the mechanism-side holding face continuously widens.

Further, according to the invention an arrangement for a cargo loading system of an aircraft or spacecraft, in particular of an aeroplane, is proposed, which comprises at least one mechanism and at least one fastening device according to the invention. In this context, the fastening portion comprising the at least one mechanism-side holding face according to the invention is formed on the device. In the arrangement according to the invention for a cargo loading system, the fastening device is used for releasably fastening the device in the region of a floor of the aircraft or spacecraft. In this context, the device is provided for moving, conveying, handling or movably supporting cargo, in particular packaged goods cargo, cargo pallets and/or cargo containers. The mechanism may in particular be in the form of a roller track.

The idea behind the present invention is to fix the mechanism in the region of the floor in at least one direction by means of two mutually facing holding faces, a latch-component-side holding face and a mechanism-side holding face, and to form and arrange these mutually facing holding faces in such a way that during the unlocking process, in other words when bringing the latch component from the locked position into the unlocked position, a gap between these holding faces continuously widens, in other words a distance between these holding faces thus constantly increases as the locking is released. This has the advantage that even if dirt such as sand penetrates between the holding faces, for example while the mechanism is being fastened, the holding faces can be prevented from jamming with respect to one another. Particularly in an application of the fastening device in the region of a floor, especially a cargo hold floor, of an aircraft or spacecraft, this creates the possibility of reliably and time-efficiently fastening a mechanism such as a roller track which is part of a roller system for a cargo loading system. Annoying delays due to jamming fastening means when rearranging a cargo hold can be prevented using the invention.

Advantageous configurations, improvements and developments of the invention may be taken from the dependent claims and from the description with reference to the drawings.

In a configuration of the fastening device according to the invention, the passage of the latch component into the locked position makes it possible to bring the latch-component-side holding face into planar contact with the mechanism-side holding face. In this way, particularly effective fixing of the mechanism can be achieved.

In accordance with an advantageous configuration of the fastening device, the latch-component-side holding face forms a portion of a screw face.

In accordance with a further advantageous configuration, the mechanism-side holding face forms a portion of a screw face.

In accordance with another further improvement, the latch-component-side holding face and the mechanism-side holding face are each in the form of a portion of a screw face.

As a result of holding faces in the form of screw faces, the widening of the gap between the latch-component-side and mechanism-side holding faces can be provided in a simple and effective manner.

It may be advantageous to form the latch-component-side and mechanism-side holding faces as portions of screw faces which are of the same type and parameterised in the same manner, in particular having the same pitch. The screw faces which define the latch-component-side and mechanism-side holding faces may in particular be identical. This makes it easier to produce planar contact between the holding faces in the locked position. In a development of the fastening device, the latch component is formed in such a way that the latch-component-side holding face can be brought into engagement with the mechanism-side holding face in the manner of a thread when the mechanism is positioned in the mounting position on the floor component and/or on the base component and the latch component is passing from the unlocked position into the locked position. By way of this development, reliable locking of the mechanism and additionally continuous widening of the gap between the holding faces during unlocking can be achieved in a simple manner.

In a further development of the fastening device, the latch component is mounted on the base component so as to be rotatable about an axis of rotation. In this context, the latch component can be moved between the unlocked position and the locked position by way of a rotational movement about the axis of rotation. This may improve the ease of operation of the fastening device, for example even if an operator is wearing gloves, for example, during the locking and unlocking process for reasons of temperature or for otherwise protecting the hands. Further, the possibility of rotating the latch component, in conjunction with the latch-component-side and mechanism-side holding faces being in the form of portions of a screw-face, makes possible an expedient implementation of the widening of the gap between the holding faces during unlocking.

In a configuration of the fastening device, the passage of the latch component from the locked position into the unlocked position or from the unlocked position into the locked position can be brought about by twisting the latch component about the axis of rotation through an angle of less than 180 degrees, preferably through an angle of substantially 90 degrees. This configuration facilitates the handling of the fastening device. In addition, in particular if the angle is substantially 90 degrees, an operator can easily detect whether the latch component is located in the locked position or in the unlocked position or between the two. Furthermore, an angle of substantially 90 degrees may be favourable if a plurality of holding portions, in particular two, are to be arranged on the latch component, so as to fasten a plurality of mechanisms, in particular two, releasably by means of a rotational movement.

In an advantageous development of the fastening device, a first resilient element is provided, which is coupled to the base component and the latch component in such a way that the first resilient element counters the passage of the latch component from the locked position into the unlocked position. The first resilient element may in particular be in the form of a first spring. This development may advantageously contribute to preventing the latch component from being unintentionally moved out of the locked position thereof. As a result, the reliability of the fastening device can be increased.

In a further advantageous configuration of the fastening device, the latch component and the base component are coupled to one another in such a way that the latch component latches releasably at least in the locked position, preferably in each of the locked position and the unlocked position. The latching can likewise contribute to preventing the latch component from moving out of the locked position without operator intervention.

In this configuration, if the first resilient element is also provided at the same time, double securing of the latch component against unintentional movement out of the locked position can be achieved. Latching in the unlocked position may additionally simplify laying the device in the predefined mounting position.

In accordance with a further development of the fastening device, a second resilient element, in particular a second spring, is provided, by means of which an engagement element, displaceably guided in the latch component, is resiliently coupled to the latch component. In addition, in this development at least one engagement recess associated with the locked position is provided on the base component or on a part rigidly connected to the base component. In a preferred variant, a further engagement recess associated with the unlocked position may additionally be provided on the base component or on the part rigidly connected to the base component. In this context, the engagement element can engage in the engagement recess or engagement recesses for releasable engagement under the action of the second resilient element. By way of this configuration, effective releasable engagement of the latch component on the base component or on the part rigidly connected to the base component, which part may for example be a mounting ring for mounting the latch component on the base component, may be brought about.

In a further advantageous configuration of the fastening device, both the first resilient element and the second resilient element are provided as well as the engagement element and the engagement recess(es). This has the advantage that, for example if one of the resilient elements fails—for example by breaking—the latch component can still be held reliably in the locked position. This can further improve the safety of the fastening device according to the invention.

In accordance with a configuration of the fastening device, the base component comprises at least one support portion comprising at least one support face. In this context, in the unlocked position of the latch component the fastening portion of the mechanism can be laid in part on the support face. This facilitates defined positioning of the fastening portion of the mechanism with respect to the latch component and the base component, and the device can additionally be supported against acting loads by the base part in the region of the fastening portion.

In accordance with a development of the fastening device, the base component is formed in such a way that it can be brought into positive engagement with the fastening portion of the mechanism, when the mechanism is laid in part on the floor component and/or on the base component in the predefined mounting position, in such a way that it is made possible for tensile loads to be transferred between the mechanism and the base component in a first direction. In this context, it is provided that the first direction extends substantially perpendicular to a second direction, along which the fastening portion of the mechanism can be fixed by the cooperation of the latch-component-side holding face and the mechanism-side holding face. The mechanism is thus advantageously also prevented by means of the fastening device from moving with respect to the floor in a second direction. This is brought about in a simple manner by laying the mechanism on.

In a further development of the fastening device, the base component comprises a projection which is formed and arranged in such a way that the projection can be introduced into an associated opening of the mechanism, when the mechanism is laid on the floor component and/or on the base component, so as to bring about the positive engagement. In this context, the projection is preferably formed in such a way that it only fills up the associated opening of the mechanism in part when it engages in the opening. In this development, the positive engagement and the transmission of tensile forces are implemented in a simple manner.

In accordance with a configuration of the fastening device, the latch component comprises two holding portions each comprising a latch-component-side holding face, the holding portions preferably being provided on opposite ends of the latch component. In this configuration, two mechanisms can advantageously be releasably fastened to the respective fastening portions thereof in the region of the floor simultaneously by passing, in particular twisting, a single latch component from the unlocked position into the locked position.

In accordance with a further configuration of the fastening device, the base component comprises two support portions each comprising at least one support face for a respective fastening portion of an associated one of two mechanisms which are to be releasably fastened. This provides the possibility of supporting and positioning and provides support for two mechanisms on one base component.

In a development of the arrangement according to the invention for a cargo loading system, the mechanism is formed so as to be reversible, the fastening portion comprising an upper side and an underside and a mechanism-side holding face being formed in the same manner in each case in the region of the upper side and the underside of the fastening portion. This development has for example the advantage that the mechanism can be releasably fastened in two positions in the region of the floor in the same manner by means of the fastening device. This may for example also be advantageous, among other cases, if the mechanism is formed with a planar underside which can be faced towards the cargo hold as a result of the reversal.

In accordance with a development of the arrangement for a cargo loading system, the mechanism is in the form of a roller track. As a result of using the fastening device according to the invention, it is reliably possible to fasten the roller track releasably in the region of the floor, and it can be made much easier to reconfigure a cargo hold in which the cargo loading system is installed.

In a further development of the arrangement for a cargo loading system, the fastening portion is in the form of an end portion of the mechanism. In this context, the mechanism-side holding face is formed on the fastening portion, proceeding from an edge of the fastening portion. In a preferred variant, the holding face may be worked into the end portion of the mechanism starting from an end-face edge of the mechanism. In this development, the fastening portion can be engaged around particularly well by the holding portion of the latch component.

In accordance with another further development of the arrangement for a cargo loading system, two opposing end portions of the mechanism are each in the form of a fastening portion each comprising at least one mechanism-side holding face. In this way, the mechanism can be fastened releasably particularly expediently. This may in particular take place by means of two fastening devices according to the invention, in which case each of the two fastening portions is engaged around by the holding portion of the latch component of an associated one of the two fastening devices and thus locked.

The above configurations, developments and improvements may be combined with one another in any desired manner, within reason. Further possible configurations, developments and implementations also comprise combinations which are not explicitly mentioned of features of the invention which are disclosed in the above or in the following in relation to the embodiments. In particular, in this context, the person skilled in the art will also add individual aspects to the respective basic form of the invention as improvements or additions.

BRIEF DESCRIPTION OF THE DRAWINGS

In the following, the invention is explained in greater detail by way of embodiments with reference to the appended drawings, in which.

DETAILED DESCRIPTION

Figures 1, 1A:
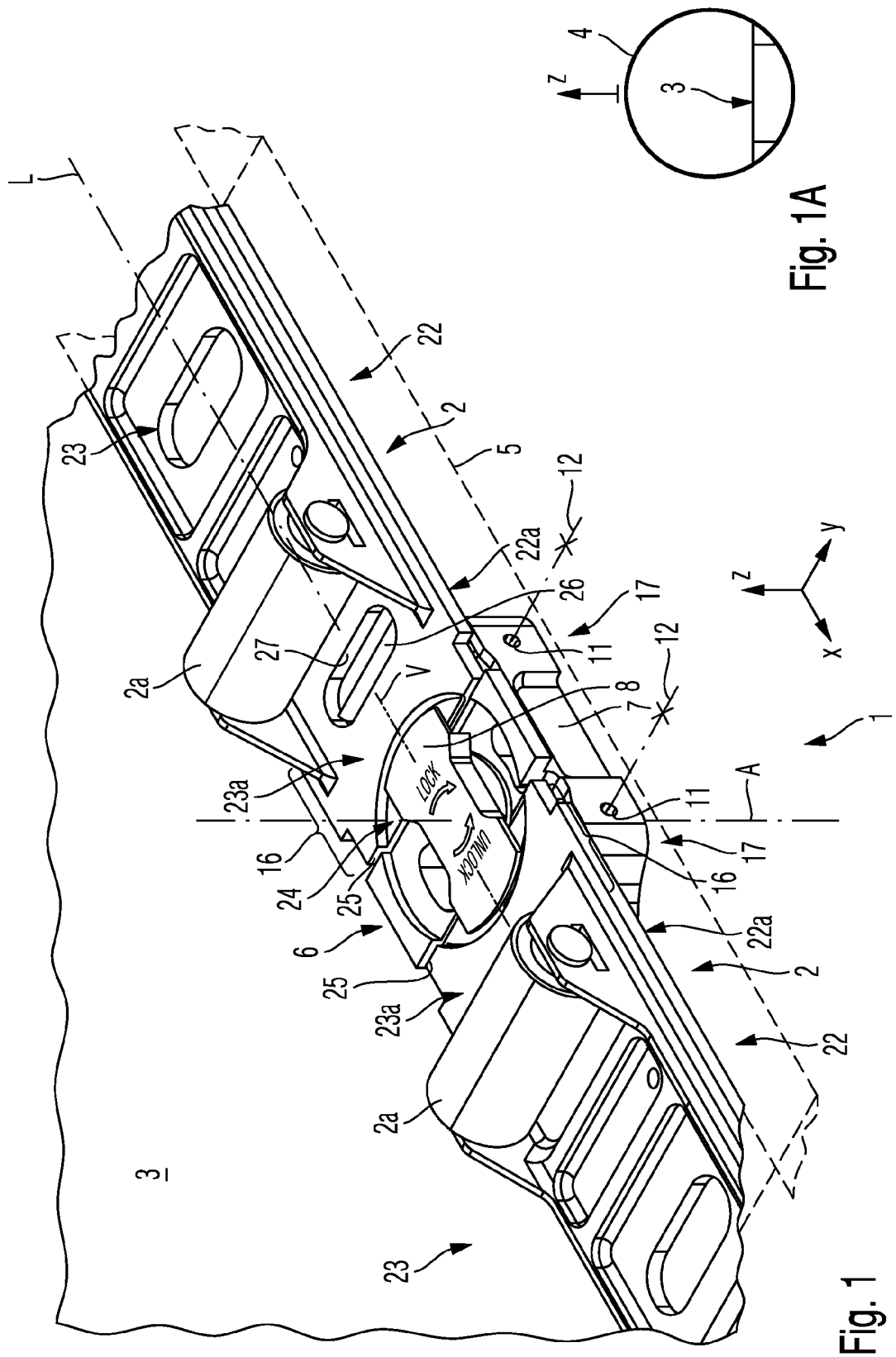
FIG. 1 is a perspective view from above of an arrangement of a cargo loading system comprising a fastening device in accordance with an embodiment of the invention, two mechanisms in the form of roller tracks being fastened releasably in the region of a schematically indicated cargo hold floor of an aeroplane by means of the fastening device.
FIG. 1A is a schematic sketch of a cross-section of an example aeroplane fuselage comprising a cargo hold floor.

The appended drawings are intended to convey further understanding of the embodiments of the invention. They illustrate embodiments and, in conjunction with the description, serve to illustrate principles and ideas relating to the invention. Other embodiments and many of the stated advantages can be seen from the drawings. The elements of the drawings are not necessarily shown to scale with one another. In the drawings, like reference numerals denote like, functionally equivalent or equivalently operating elements, features and components unless stated otherwise.

FIG. 1 shows part of an arrangement 1 for a cargo loading system in the cargo hold of an aeroplane, not shown in its entirety. The arrangement 1 comprises a number of mechanisms 2 which are in the form of roller tracks of a roller system for the cargo loading system, comprise rollers 2a, and serve to support in particular cargo pallets and/or cargo containers movably, making it possible to move and position them within the cargo hold.

FIG. 1 also schematically shows a floor 3 of the cargo hold. FIG. 1A is a schematic cross-section through an example aeroplane fuselage 4, the floor 3, extending transversely through the aeroplane fuselage 4, of the cargo hold also being shown. However, the drawing of FIG. 1A is merely intended to be illustrative, and it goes without saying that the aeroplane fuselage 4 need not necessarily be formed with a circular cross-section as shown in FIG. 1A, but may also have a different expedient cross-section. In addition, the floor 3 may be positioned at any desired expedient position along a vertical direction z of the aeroplane fuselage 4, depending on the desired division of an aeroplane interior into cargo regions and regions for other purposes.

Ducts 5 are provided in the floor 3, and are formed in the floor 3 as floor components for introducing loads, for example from gravitational forces from the cargo pallets or cargo containers lying on the mechanisms 2. One of the ducts 5 is shown in FIG. 1 and extends by way of example in a longitudinal direction x of the aeroplane fuselage 4.

The arrangement 1 in accordance with the embodiment of FIG. 1 additionally comprises fastening devices 6 for releasably fastening the device 2 to the floor 3, only one of the fastening devices 6 being shown in FIG. 1 for reasons of clarity. However, further fastening devices 6 are formed in the same manner described in the following and shown in FIGS. 1 to 7 for the fastening device 6 shown in FIG. 1.

Figure 2:
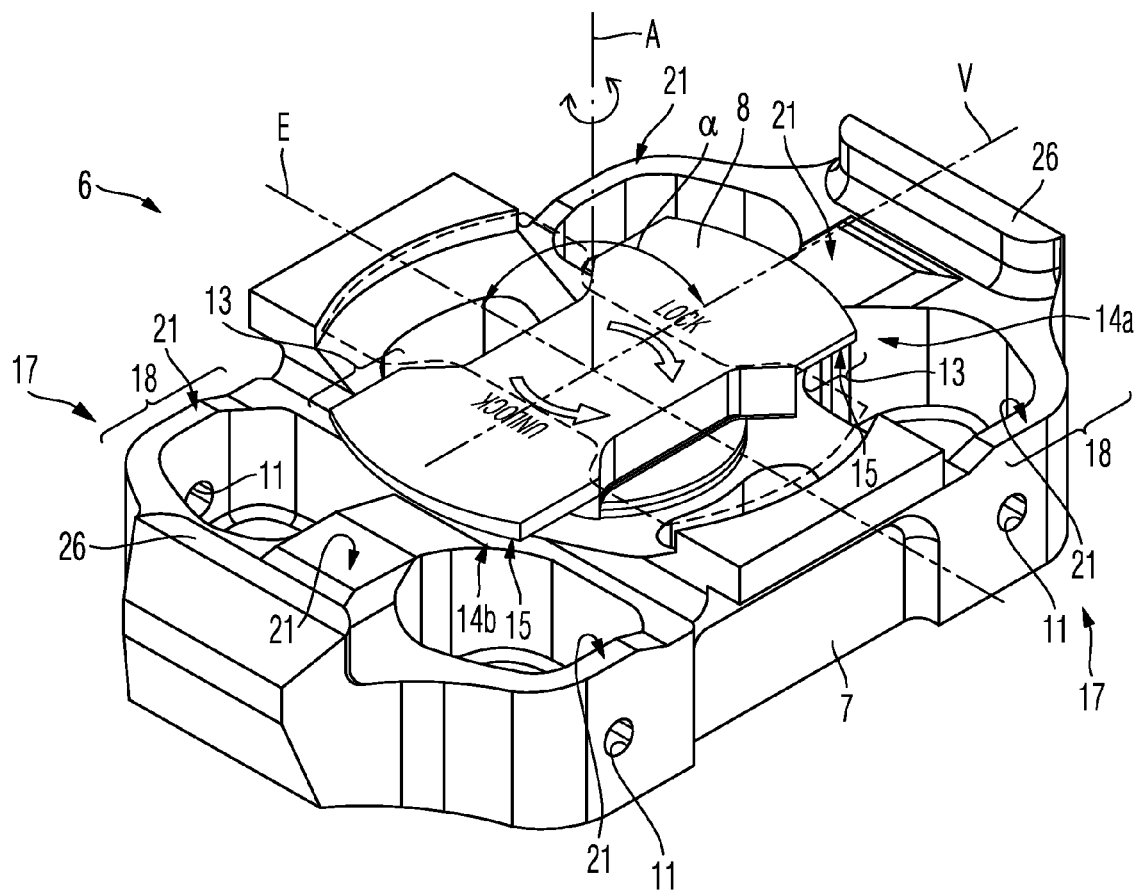
FIG. 2 is a perspective view from above of the fastening device in accordance with the embodiment of FIG. 1, mechanisms which are fastened by means of the fastening device not being shown.

The fastening device 6, which is shown in FIG. 2 without the mechanisms 2 in the form of roller tracks, comprises a base component 7 and a latch component 8. The base component 7 is provided so as to be coupled rigidly to the duct 5. For this purpose, by way of example, the base component 7 shown in FIG. 2 comprises lateral holes 11, by means of which the base component 7 can be rigidly connected to the duct 5, for example by screwing using screws 12 (only shown schematically in FIG. 1).

The latch component 8 is mounted on the base component 7 so as to be rotatable through an angle α about an axis of rotation A with respect to the base component 7, making it possible to twist the latch component 8 from a locked position V to an unlocked position E with respect to the base component 7. In the embodiment shown, the axis of rotation A extends substantially parallel to the vertical direction z when the base component 7 is rigidly connected to the duct 5.

FIG. 2 shows the latch component 8 in the locked position V thereof, whilst the outline of the latch component 8 for the unlocked position E is shown as a dashed line in FIG. 2. In the embodiment shown, the angle α through which the latch component can be rotated between the unlocked position E and the locked position V with respect to the base component is substantially 90 degrees.

Further, the latch component 8 is equipped with two holding portions 13, which are arranged at opposite ends 14a, 14b of the latch component 8. Each of the holding portions 13 is equipped with a latch-component-side holding face 15 which faces towards the base component 7.

As is shown in FIG. 1, the two mechanisms 2 each comprise a fastening portion 16, the fastening portions 16 each being formed as an end portion of the associated mechanism 2. It should be noted that each of the mechanisms 2 (only shown in part) may comprise two opposite end portions, each of which is in the form of a fastening portion 16 which is disclosed in greater detail in the following. However, FIG. 1 only shows one end portion formed in this manner for each of the two mechanisms 2.

Figure 3:
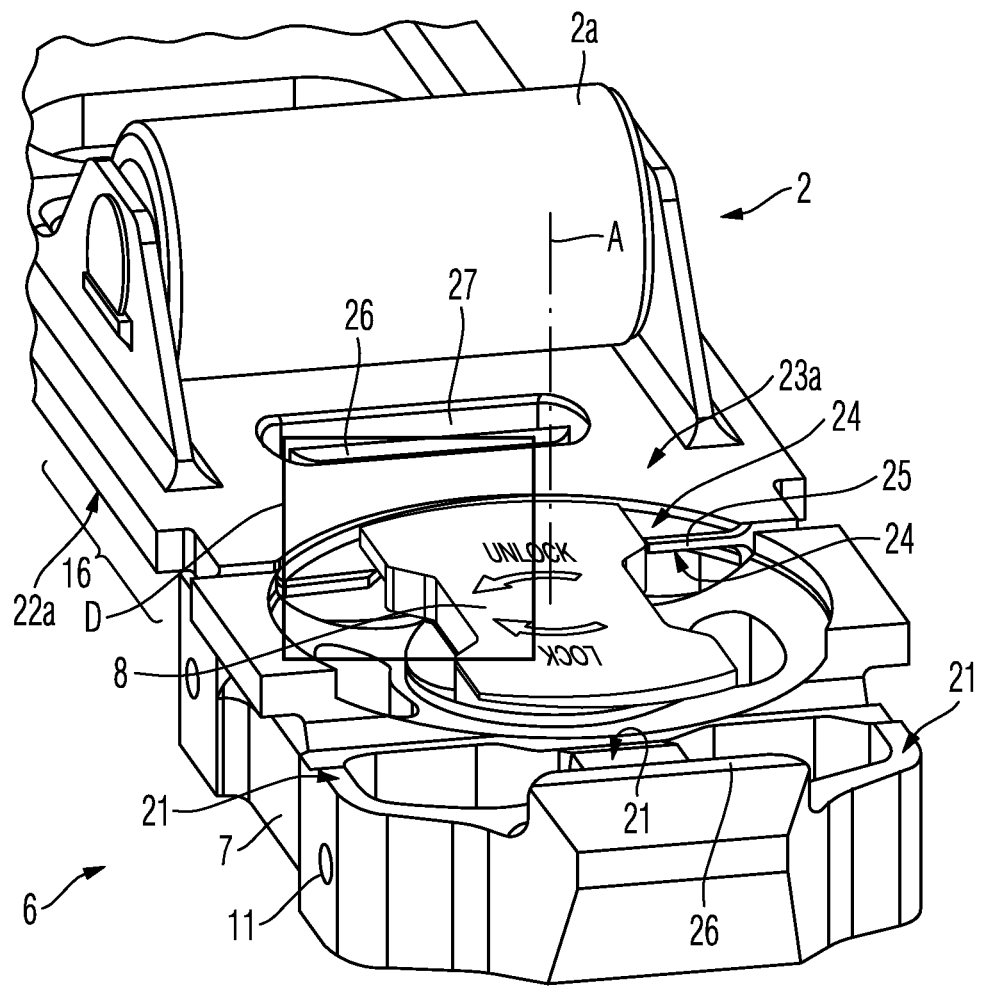
FIG. 3 is a further perspective view from above of the fastening device according to FIG. 1, only one mechanism in the form of a roller track being fastened releasably in the region of a cargo hold floor (not shown) by means of the arrangement.

The base component 7 of the fastening device 6 comprises two support portions 18 arranged at opposite ends 17 of the base component, support faces 21 for the fastening portion 16 of one of the mechanisms 2 being formed inside each of the support portions 18 on the base component 7; see FIGS. 2 and 3.

In the unlocked position E (see FIG. 2) of the latch component 8, the fastening portion 16 of each of the two means 2 may be laid in part on the respective support face 21 of the associated support portion 18 on the base component 7. The support faces 21 may for example be planar in form and, when the base component 7 is rigidly connected to the duct 5, extend substantially parallel to a surface, facing the cargo hold, of the floor 3.

Figure 4:
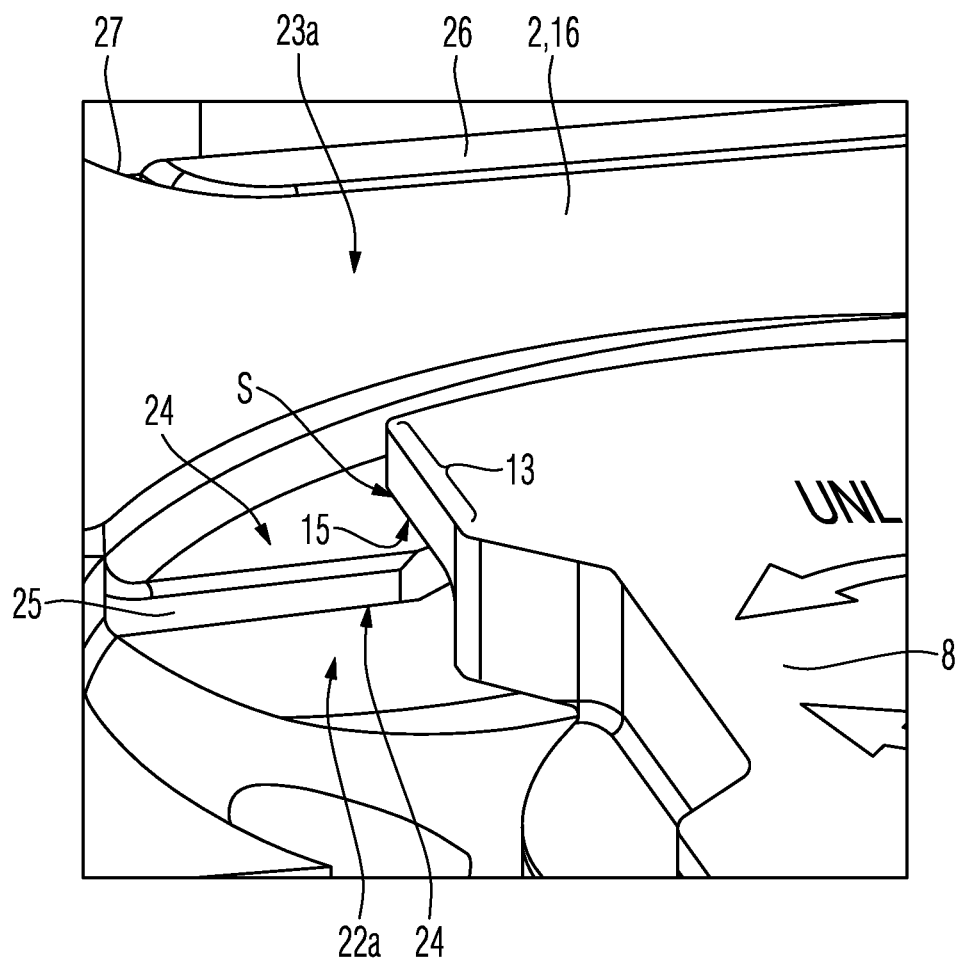
FIG. 4 is a detail D as indicated in FIG. 3.

As shown in FIGS. 1, 3 and 4, the fastening portion 16 comprises an underside 22a and an upper side 23a. In the mounting position shown in FIG. 1 of the two mechanisms 2, each of the two mechanisms 2 is positioned in the region of the fastening portion 16 in surface portions, likewise preferably planar in form, of the underside 22a on the associated support faces 21. In addition, in a preferred variant, each of the mechanisms 2 may be laid in part on the duct 5, for example on an edge or a step of the duct 5, for support in the vertical direction z.

The fastening portion 16 is further equipped with a mechanism-side holding face 24 in each case in the region of the underside 22a and the upper side 23a. The fastening portion 16 is thus provided with two mechanism-side holding faces 24, formed in the same manner, on opposite faces of the fastening portion 16. The mechanism-side holding faces 24 extend into the fastening portion 16, proceeding from an edge 25 thereof, and may for example be worked into the fastening portion 16 by mechanical machining.

It should be noted that in the embodiment shown in FIG. 1 the fastening portions 16 are formed in the same manner on both mechanisms 2. In this embodiment, the two holding portions 13 comprising the latch-component-side holding faces 15 are also formed in the same manner.

In the situation shown in FIG. 1, as stated previously, the two mechanisms 2 in the form of roller tracks are each located in a predefined mounting position, into which they can be brought when the latch component 8 is located in the unlocked position E thereof (see FIG. 2).

So as to fasten the device 2 releasably in the region of the floor 3, the latch component 8 is brought from the unlocked position E into the locked position V by rotation through the angle α about the axis of rotation A. FIG. 1 shows the latch component 8 in the locked position V. When the latch component 8 passes into the locked position V, each of the two holding portions 13 of the latch component 8 engages around the fastening portion 16 of the associated mechanism 2 in the region of the respective mechanism-side holding face 24 facing away from the base component 7. During this engagement around the mechanism-side holding face 24, facing away from the base component 7, of the fastening portion 16, the respective latch-component-side holding face 15 is facing towards the associated mechanism 2. As a result of the latch component 8 passing to the locked position V, the latch-component-side holding face 15 and the facing mechanism-side 24, upper in FIG. 1, are brought into planar contact with one another.

As can be seen in particular from FIGS. 3 and 4, both the latch-component-side holding faces 15 and the mechanism-side holding faces 24 are each in the form of portions of a suitable screw face. In the embodiment shown, the screw faces which define the holding faces 15 and 24 are of the same type and have the same pitch. As a result, when the latch component 8 is twisted from the unlocked position E into the locked position V each of the latch-component-side holding faces 15 can be brought into engagement in the manner of a thread with the associated facing mechanism-side holding face 24 when the mechanisms 2 are located in the mounting positions thereof as shown in FIG. 1.

As a result of the rotation about the axis of rotation A, surface points of the latch-component-side holding faces 15 move on circular paths in parallel planes which extend normal to the axis of rotation A. The mutually facing holding faces 15 and 24 are formed in such a way that when the locking is released by twisting the latch component 8 from the locked position V into the unlocked position E a gap S between the latch-component-side holding face 15 and the facing mechanism-side holding face 24 widens continuously during the twisting, in other words the width of the gap S continuously increases. The distance between the holding faces 15 and 24, measured normal to these holding faces 15 and 24, should be treated as the gap width. If the mutually facing holding faces 15 and 24 are in planar contact against one another in the locked position V, the gap width is substantially zero in this position of the latch component 8. When the latch component 8 is twisted in the direction towards the unlocked position E, the gap S, indicated by reference numeral S in FIG. 4, appears, and continuously widens during the opening of the locking.

The continuous increase in the gap width between the two mutually facing holding faces 15 and 24 has the advantage that foreign bodies, in particular sand and dirt, which can easily arrive predominantly on the upwards-facing mechanism-side holding face 24, as a result of the arrangement of the fastening device 6 in the region of the floor 3, and thus between the mutually facing holding faces 15 and 24 during the twisting of the latch component 8 into the locked position V, do not lead to the latch component 8 jamming with respect to the fastening portion 16 when the locking is opened, in other words when the latch component 8 is twisted from the locked position V into the unlocked position E. In this way, it can advantageously be ensured that the locking can be released in a simple and time-efficient manner without jamming.

Because the latch component 8 can be twisted about the axis of rotation A, the fastening device 6 is easy to handle. For example, the fastening device 6 can still be operated well by an operator even with padded gloves. In addition, two fastening portions 16 can be fixed by means of a single rotation movement. The angle α of 90 degrees between the locked and unlocked positions makes it possible for the operator to detect rapidly and without difficulty whether the latch component 8 is located in the desired position.

In addition to the support faces 21, a projection 26 is provided at each end 17 of the base component 7. The two projections 26 project from the base component, are arranged on the same side of the base component 7 on which the support faces 21 are also arranged, and protrude beyond the support faces 21, as is shown for example in FIGS. 2, 3 and 7. For example, the projections 26 may extend substantially parallel to the axis of rotation A.

If one of the mechanisms 2 shown in FIG. 1 is brought into the predefined mounting position thereof and in the process the mechanism 2 is laid in part on the duct 5 and the fastening portion 16 thereof is laid on the support faces 21, one of the projections which is associated with the mechanism 2 engages positively in an associated opening 27 formed on the mechanism 2, in that the projection 26 is introduced into the opening 27. This is shown in FIGS. 1, 3 and 4. The engagement of the projection 26 in the opening 27 makes it possible for tensile forces to be transmitted between the base component 7 and the mechanism 2 in direction x (see FIG. 1), which extends parallel to a longitudinal direction L of the mechanism 2, and thus substantially perpendicular to the vertical direction z in which the mechanism is fixed by the cooperation of the mutually facing holding faces 15 and 24. Advantageously, the projection 26 only fills the opening 27 in part and not completely, and only a surface portion thereof facing the axis of rotation A and the latch portion 8 lies on a surface, bordering the opening 27, of the mechanism 2.

In FIG. 1, the two mechanisms 2 in the form of roller tracks are arranged in such a way that the rollers 2a project upwards from the floor 3 in the vertical direction z. In this way, loads, in particular containers and pallets for cargo, can be deposited on the rollers 2a and moved inside the cargo hold and positioned therein by means of the rollers 2a.

As disclosed above, two mechanism-side holding faces 24 formed in the same manner are provided on each of the fastening portions 16. The opening 27 is in the form of a through-opening in which the projection 26 can engage both from the underside 22 and from the upper side 23 of the mechanism 2, depending on whether the underside 22 or the upper side 23 is facing the base component 7.

In this way, the two mechanisms 2 are formed so as to be reversible. Starting from the state shown in FIG. 1, the locking can be released by passing the latch component 8 of the shown fastening device 6 into the unlocked position E—and if applicable by twisting the latch component 8 of a fastening device 6 (not shown in FIG. 1), arranged on the other end (not shown) of the mechanism for fixing a further fastening portion 16 of the mechanism 2, in a corresponding manner.

The mechanism 2 can subsequently be removed from the base component 7 and the duct 5. After reversing the mechanism 2, in other words after rotating it through 180 degrees about the longitudinal axis thereof—cf. FIG. 1—the mechanism 2 can in turn be laid in part on the base component 7 and the duct 5, the rollers 2a of the mechanism 2 subsequently disappearing in the duct 5. If the underside 22 of the mechanism 2—excluding the region in which the mechanism-side holding face 24 is arranged—is planar in form, a planar, obstacle-free cargo hold floor can be created by reversing the mechanism 2, and can be traveled over without difficulty, for example by a motor vehicle, after releasably fastening the mechanism 2 in the reversed position.

When the mechanism 2 is laid on in the reversed position, planar portions of the upper side 23a of the fastening portion 16 come into contact with the support faces 21 formed on the base component 7. By twisting the latch component 7 through the angle α from the unlocked position E into the locked position V, the mechanism 2 can in turn be releasably fixed in position in the region of the floor 3. Forces which act in the longitudinal direction L of the mechanism 2 on the underside 22, which is turned upwards in the reversed position, for example when it is traveled over by a motor vehicle, can be braced by means of the projection 26 and the opening 27 as tensile loads. If the two ends of the mechanism 2 are each fixed by means of a fastening device 6, it is possible to absorb forces in both directions along the longitudinal direction L as tensile loads. Since the projections 26 do not completely fill the respectively assigned opening 27, a compressive load on the mechanism 2 in the longitudinal direction L can be prevented and kinking of the mechanism 2 can be prevented.

In this context, it should be noted that it may be advantageous, as can be seen for example from FIG. 3, if the projection 26 and the latch component 8 are formed and dimensioned in such a way that, when the mechanism 2 is fastened, the projection 26 and the latch component 8 project neither beyond the planar part of the upper side 23, in the position shown in FIG. 3 of the mechanism 2, nor beyond the planar part of the underside 22, in a reversed position of the mechanism 2.

The reversible mounting of the latch component 8 on the base component 7 is to be explained in greater detail in the following with reference to FIGS. 5, 6 and 7.

The latch component 8 comprises a central portion 31, from which the two holding portions 13 extend proceeding in opposite directions, which extend substantially parallel to the support faces 21 of the base part 7 when the fastening device 6 is assembled. In addition, a cylindrical journal 32 extends from the central portion 31, the axis of rotation A also forming a central axis of the journal 32. The holding portion 13, the central portion 31 and the journal 32 may be formed integrally with one another, as shown in the drawings. A step 33, having a cylindrical generated surface 34, of the central portion 31 transitions into the journal 32.

The step 33 is formed with a planar end face 35. The end face 35 of the latch component 8 lies on a facing, planar face 36 of an inner sleeve 37, the journal 32 extending through a central opening 41 of the inner sleeve 37; see FIG. 7. The inner sleeve 37 is rigidly connected to the latch component 8 in such a way that when the latch component 8 is twisted about the axis of rotation A the inner sleeve 37 is twisted together with the latch component 8. The rigid connection of the inner sleeve 37 and the latch component 8 may for example be implemented by means of a plurality of screws 42, as shown in FIG. 6.

Figure 5:
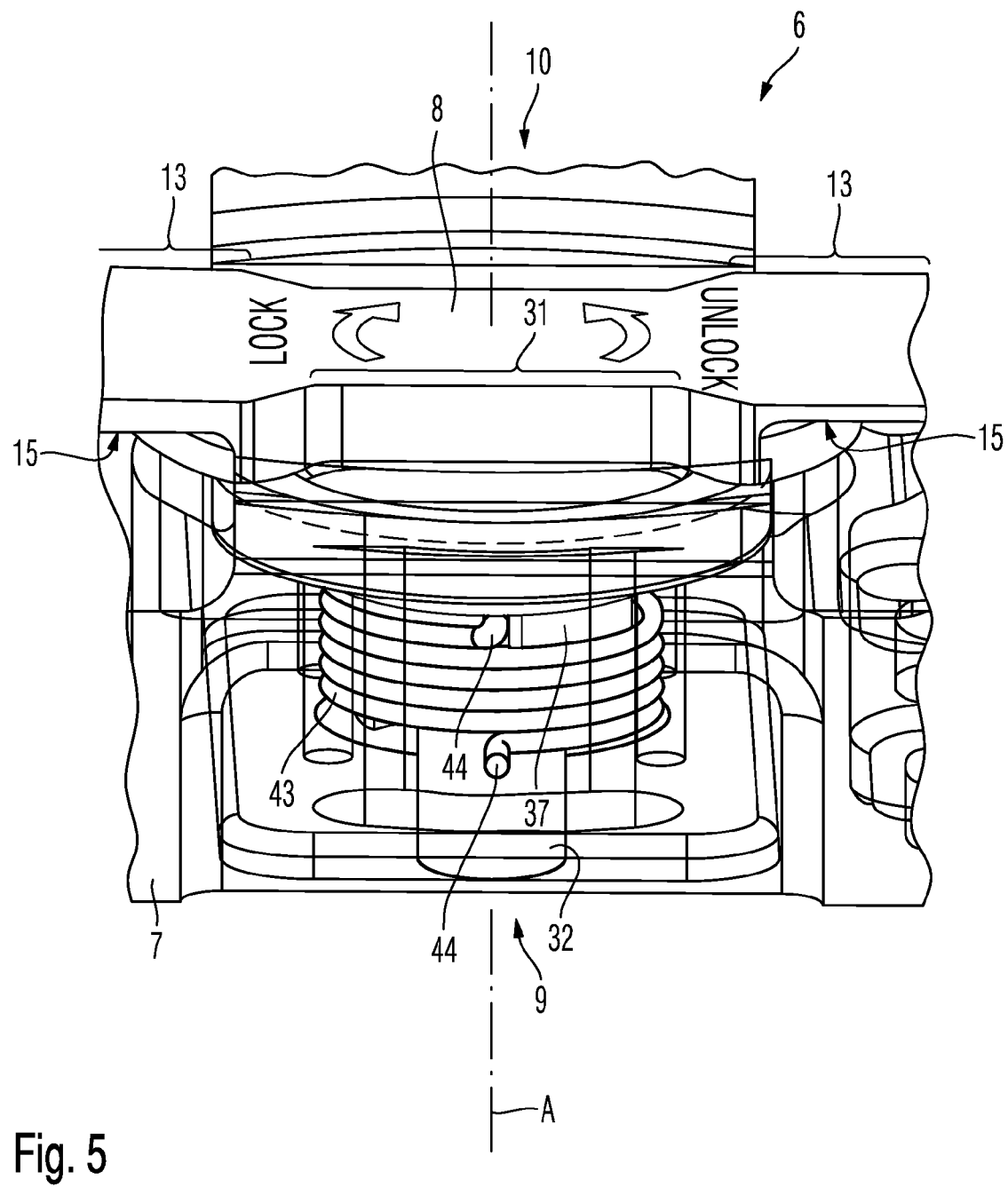
FIG. 5 is a perspective partial view of the fastening device in accordance with the embodiment of FIG. 1, a base component of the fastening device being shown half-transparent for clearer illustration.
Figure 7:
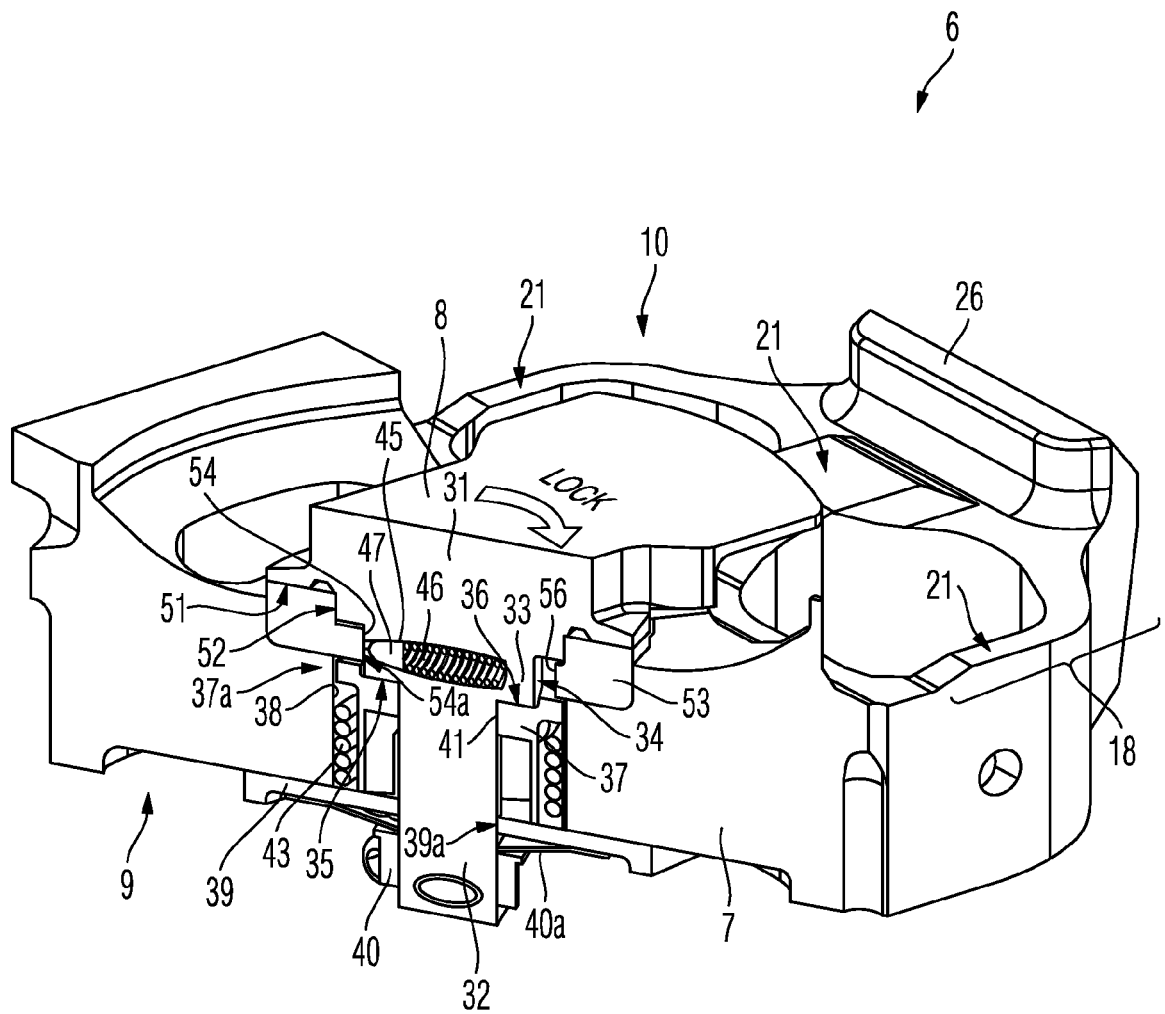
FIG. 7 is a perspective view of the fastening device in accordance with the embodiment of FIG. 1, the fastening device being shown sectioned in a vertical plane.

So as to secure the latch component 8 in the locked position V, the fastening device 6 comprises a first resilient element 43 in the form of a spring; see FIGS. 5 and 7. As is shown in these drawings, the first resilient element 43 may be in the form of a helical spring which deforms resiliently when loaded with a torque about the axis thereof, which in FIGS. 5 and 7 is coincident with the axis of rotation A. In this context, the inner sleeve 37 extends through the first resilient element 43. Portions 44 of the first resilient element 43 are engaged with a recess or opening of the inner sleeve 37 and a recess or opening of the base component 7 in such a way that twisting the latch component 8 from the locked position V into the unlocked position E counter to a torque, applied by the first resilient element 43 and acting between the base component 7 and the inner sleeve 37, about the axis of rotation A. In the embodiment shown, the first resilient element 43 is arranged in such a way that in the locked position V it exerts a torque on the latch component 8 in such a way that the latch component 8 does not undesirably automatically move out of the locked position V. In this example, an operator therefore has to apply a particular torque, for example by hand, to the latch component 8 so as to pass it into the unlocked position E.

The inner sleeve 37 and the first resilient element 43 are provided inside a clearance 38, in particular cylindrical, which is provided in the base component 7. On an underside 9 of the base component 7, a mounting plate 39 comprising a central opening 39a is fastened to the base component 7. The journal 32 extends through the central opening 39a. An end, projecting through the central opening 39a, of the journal 32 is provided with a thread, making it possible to screw a crown nut 40 onto the journal 32. The crown nut 40 is braced on the mounting plate 39 via a leaf spring 40a, causing the base component 7 to be held on the latch component 8.

In the region of the step 33, a clearance 45 extending substantially radially with respect to the axis of rotation A is provided in the central portion 31 of the latch component 8, and extends from the generated surface 34 into the latch component 8 and may for example be in the form of a cylindrical hole. A second resilient element 46, which in the embodiment shown is in the form of a compression spring, is received in the clearance 45. The second resilient element 46 is braced against the latch component 8 and loads an engagement element 47—which is likewise arranged inside the clearance 45 and is displaceably guided in a radial direction R within the clearance 45 in the latch component 8 (see FIG. 6)—with a force, causing the engagement element 47 to be resiliently coupled to the latch component 8. As a result, the second resilient element 46 presses the engagement element 47 radially outwards away from the axis of rotation A. As is shown in FIG. 6, the engagement element 47 is equipped with a rounding 48 on the face thereof remote from the second resilient element 46.

Figure 6:
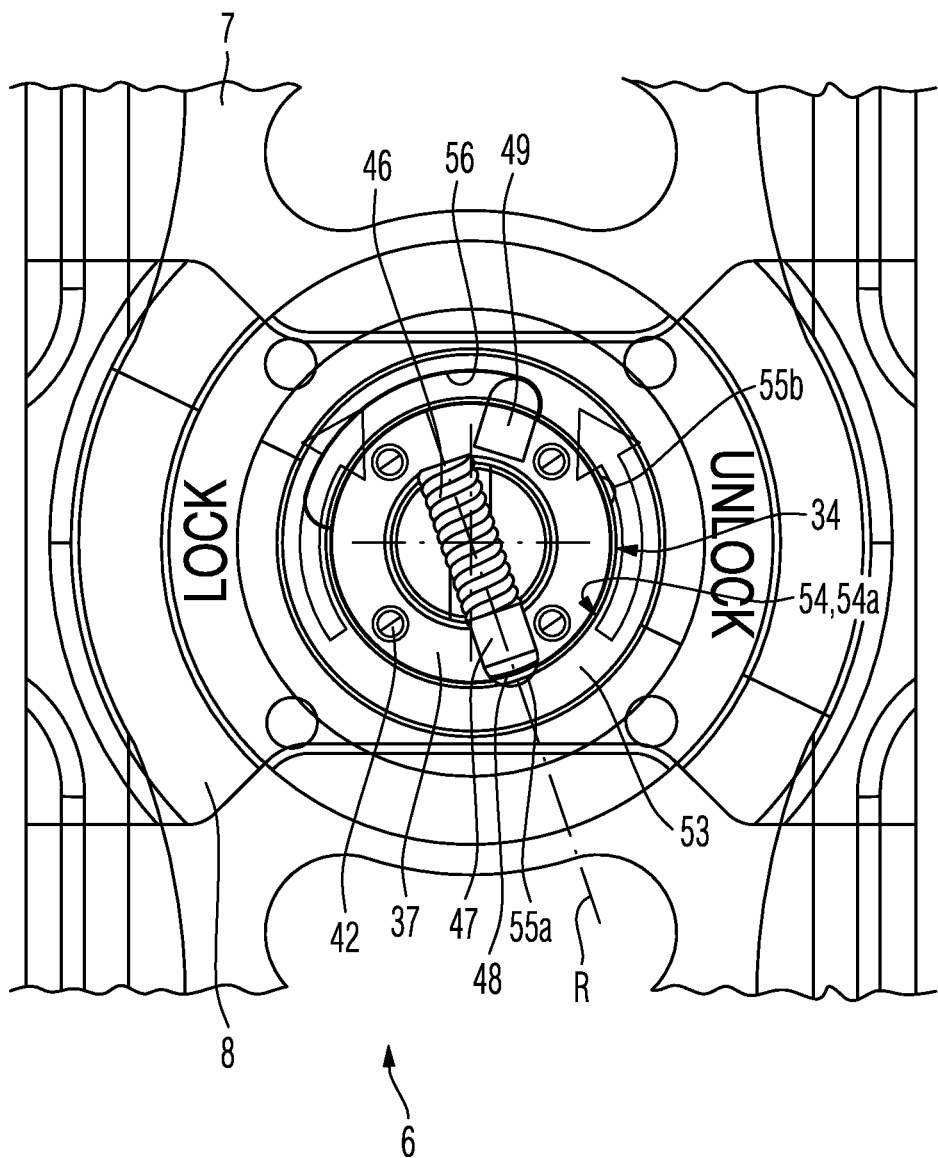
FIG. 6 is a plan view of part of the fastening device in accordance with the embodiment of FIG. 1, a latch component of the fastening device being shown half-transparent for clearer illustration.

In addition, a stop element 49 is connected to the latch component 8 in the region of the step 33—see FIG. 6—in such a way that the stop element 49 projects beyond the generated surface 34 of the step 33.

As is shown in FIG. 7, the latch component 8 is provided with an axial mounting face 51 and a radial mounting face 52 on the central portion 31 thereof. The mounting faces 51 and 52 make rotationally movable sliding mounting of the latch component 8 on the base component 7 possible by means of a mounting ring 53. The mounting ring 53 is rigidly connected, for example screwed, to the base component 7. The materials of the latch component 8 and the mounting ring 53 are preferably selected so as to result in a material pairing which is favourable for sliding mounting.

A cylindrical upper face 54a—which faces the generated surface 34 of the step 33 when the fastening device 6 is assembled—of a through-opening 54 of the mounting ring 53 is provided with two engagement recesses 55a and 55b and with a pocket 56. The stop element 49 engages in the pocket 56, which extends over an angle of substantially 90 degrees around the axis of rotation A, the stop element 49 being present at a respective end of the pocket 56 in the unlocked position E and in the locked position V respectively. As a result, the angle of rotation α is limited to an angle of substantially 90 degrees, and it is provided that the latch component 8 cannot be twisted beyond the provided locked position V or the provided unlocked position E.

In the locked position V, shown in FIG. 6, of the latch component 8, the rounding 48 of the engagement element 47 engages so as to lock into the engagement recess 55a, which is likewise formed rounded, under the action of the second resilient element 46. By contrast, after the latch component 8 is twisted into the unlocked position E, the rounding 48 of the engagement element 47 engages so as to lock into the engagement recess 55b, which is likewise formed rounded. In this way, it can be provided that the latch component 8 engages releasably in the locked position V and in the unlocked position E with respect to the base component 7.

For example, the first and second resilient elements 43 and 46 may be formed in such a way that the latch component 8, when it has been brought into the unlocked position E, remains in said position without any activity by the operator, so as to make it easier to set down or remove the mechanism 2. As a result of the operator applying a torque to the latch component 8 about the axis of rotation A, the engagement element 47 can be released from the engagement recess 55b, counter to the action of the second resilient element 46, and the latch component 8 can be passed into the locked position V in which the latch element 47 engages so as to be locked releasably in the engagement recess 55a. In turn, the engagement is released by the operator applying a sufficient torque to the latch component 8.

In the locked position V, the latch component 8 is thus held in the locked position V by means of the first resilient element 43 and simultaneously by means of the releasable engagement of the engagement element 47 in the engagement recess 55a, until the operator deliberately applies a sufficient torque to the latch component 8 so as to pass it into the unlocked position E. The latch component 8 is thus doubly secured against undesired adjustment out of the locked position V. Even if one of the resilient elements 43, 46 should fail, it can be ensured that the latch component 8 does not move out of the locked position V of its own accord.

In addition, any failure of one of the resilient elements 43, 46 can be made apparent to the operator. If the first resilient element 43 fails, for example by breaking, the torque acting between the latch component 8 and the base component 7 from the first resilient element 43, counter to which torque the latch component 8 is adjusted from the locked position V into the unlocked position E, disappears. This can be detected by the operator when operating the fastening device 6. By contrast, if the second resilient element 46 fails, this is apparent from the lack of engagement of the engagement element 47. In this way, it can advantageously be provided that a defect of this type in the fastening device 6 is noticed during operation and can be eliminated.

Additional securing of the latch component 8 against undesired release of the latch component 8 from the base component 7 along the axis of rotation A is additionally provided by the cooperation of the mounting ring 53 and the inner sleeve 37. An external diameter of the inner sleeve 37 is formed larger, in the region of an end facing the mounting ring 53, than an internal diameter of the through-opening 54 of the mounting ring 53. The end 37a may form a circumferential shoulder for this purpose. As a result, the latch component 8 is not only secured by means of the crown nut 40 and the leaf spring 40a against the latch component 8 being pulled upwards out of the base component 7, but is additionally held back on the mounting ring 53 by means of the inner sleeve 37 which is rigidly connected to the latch component 8.

In the fastening device 6 in accordance with this embodiment, the two resilient elements 43 and 46, as well as the engagement element 47, the engagement recesses 55a, 55b, the stop element 49 and the pocket 56, are arranged in the interior of the fastening device 6 so as to be well protected against external influences.

The components of the fastening device 6 and of the mechanisms 2 in accordance with the embodiment shown are preferably manufactured from materials which are suitable for use in the field of air and space travel. The person skilled in the art can select suitable metal and/or plastics materials for each component in accordance with the mechanical loads which are to be expected.

Although the present invention has been disclosed in the above entirely by way of preferred embodiments, it is not limited thereto, but can be modified in various ways.

Even though the latch component is provided with two holding portions in the embodiment shown, the latch component could also for example only comprise one holding portion. In this case, the base component could for example be formed in such a way that it only makes it possible to lay on and releasably fix a single mechanism.

As disclosed above, the fastening device may advantageously be used for releasably fastening roller tracks, which are preferably reversible, in the region of a cargo hold floor. However, the fastening device may also be found to be of use for releasably fastening other mechanisms, in particular other components of a cargo loading system, in the region of the cargo hold floor.

What is claimed is:

1. A fastening device for releasably fastening a mechanism in the region of a floor, in particular a cargo hold floor, of an aircraft or spacecraft,
    comprising a base component, which is provided so as to be rigidly coupled to a floor component which is formed for introducing a load into the floor; and
    comprising a latch component, which comprises at least one holding portion comprising a latch-component-side holding face and is coupled to the base component such that the latch component is movable between an unlocked position and a locked position with respect to the base component;
    wherein the latch component is formed such that, when the mechanism is positioned in part in a predefined mounting position on the floor component and/or on the base component, the holding portion engages around a fastening portion, which is formed on the mechanism and which comprises at least one mechanism-side holding face, in the region of the mechanism-side holding face during the passage of the latch component into the locked position, such that the latch-component-side holding face faces the mechanism-side holding face; and
    the latch-component-side holding face is formed such that during passage of the latch component from the locked position into the unlocked position a gap between the latch-component-side holding face and the mechanism-side holding face continuously widens;
    wherein the base component is formed such that it can be brought into positive engagement with the fastening portion of the mechanism, when the mechanism is laid in part on the floor component and/or on the base component in the predefined mounting position, such that it is made possible for tensile loads to be transferred between the mechanism and the base component in a first direction, the first direction extending substantially perpendicular to a second direction, along which the fastening portion of the mechanism can be fixed by the cooperation of the latch-component-side holding face and the mechanism-side holding face; and
    wherein the base component comprises a projection which is formed and arranged such that the projection can be introduced into an associated opening of the mechanism, when the mechanism is laid on the floor component and/or on the base component, so as to bring about the positive engagement.

2. The fastening device of claim 1, wherein the passage of the latch component into the locked position makes it possible to bring the latch-component-side holding face into planar contact with the mechanism-side holding face.

3. The fastening device of claim 1, wherein the latch-component-side holding face forms a portion of a screw face.

4. The fastening device of claim 1, wherein the mechanism-side holding face forms a portion of a screw face.

5. The fastening device of claim 1, wherein the latch component is formed such that the latch-component-side holding face can be brought into engagement with the mechanism-side holding face in the manner of a thread when the mechanism is positioned in the mounting position on the floor component and/or on the base component and the latch component is passing from the unlocked position into the locked position.

6. The fastening device of claim 1, wherein the latch component is mounted on the base component so as to be rotatable about an axis of rotation, the latch component being able to be moved between the unlocked position and the locked position by way of a rotational movement about the axis of rotation.

7. The fastening device of claim 6, wherein the passage of the latch component from the locked position into the unlocked position or from the unlocked position into the locked position can be brought about by twisting the latch component about the axis of rotation through an angle of less than 180 degrees, preferably through an angle of substantially 90 degrees.

8. The fastening device of claim 1, wherein a first resilient element, in particular a first spring, is provided, which is coupled to the base component and the latch component such that the first resilient element counters the passage of the latch component from the locked position into the unlocked position.

9. The fastening device of claim 8, wherein the latch component and the base component are coupled to one another such that the latch component latches releasably at least in the locked position, preferably in each of the locked position and the unlocked position; and wherein a second resilient element, in particular a second spring, is provided, by which an engagement element, displaceably guided in the latch component, is resiliently coupled to the latch component, and in that at least one engagement recess associated with the locked position, and preferably additionally a further engagement recess associated with the unlocked position, is provided on the base component or on a part rigidly connected to the base component, the engagement element being able to engage in said engagement recess or engagement recesses for releasable engagement under the action of the second resilient element.

10. The fastening device of claim 1, wherein the latch component and the base component are coupled to one another such that the latch component latches releasably in each of the locked position and the unlocked position.

11. The fastening device of claim 10, wherein a resilient element, in particular a spring, is provided, by which an engagement element, displaceably guided in the latch component, is resiliently coupled to the latch component, and in that at least one engagement recess associated with the locked position, and preferably additionally a further engagement recess associated with the unlocked position, is provided on the base component or on a part rigidly connected to the base component, the engagement element being able to engage in said engagement recess or engagement recesses for releasable engagement under the action of the resilient element.

12. The fastening device of claim 1, wherein the base component comprises at least one support portion comprising at least one support face, and wherein in the unlocked position of the latch component the fastening portion of the mechanism can be laid in part on the support face.

13. The fastening device of claim 1, wherein the projection is formed such that it only fills up the associated opening of the mechanism in part upon engagement.

14. An arrangement for a cargo loading system of an aircraft or spacecraft, in particular of an aeroplane,
comprising at least one mechanism, in particular a roller track, which is provided for moving, conveying, handling or movably supporting cargo, in particular packaged goods cargo, cargo pallets and/or cargo containers, and
comprising at least one fastening device for releasably fastening the mechanism in the region of a floor of the aircraft or spacecraft according to claim 1;
wherein the fastening portion is formed with the at least one mechanism-side holding face on the mechanism.

15. The arrangement for a cargo loading system of claim 14, wherein the mechanism is formed so as to be reversible, the fastening portion comprising an upper side and an underside and a mechanism-side holding face being formed in the same manner in each case in the region of the upper side and the underside of the fastening portion.

* * * * *